United States Patent
Sobel et al.

(10) Patent No.: US 9,137,219 B1
(45) Date of Patent: Sep. 15, 2015

(54) METHODS AND SYSTEMS FOR SECURELY MANAGING MULTIMEDIA DATA CAPTURED BY MOBILE COMPUTING DEVICES

(71) Applicant: Symantec Corporation, Mountain View, CA (US)

(72) Inventors: William E. Sobel, Jamul, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/787,747

(22) Filed: Mar. 6, 2013

Related U.S. Application Data (62) Division of application No. 12/130,767, filed on May 30, 2008, now Pat. No. 8,433,895.

(51) Int. Cl.
*H04L 29/06* (2006.01)

(52) U.S. Cl.
CPC .................. *H04L 63/0442* (2013.01)

(58) Field of Classification Search
CPC .......... H04L 63/0428; G06F 21/6245
USPC ........................................ 713/150
See application file for complete search history.

(56) References Cited

U.S. PATENT DOCUMENTS

| | | | |
|---|---|---|---|
| 6,708,200 B1 | 3/2004 | Ura et al. | |
| 7,869,602 B1 | 1/2011 | Faros et al. | |
| 2004/0128552 A1* | 7/2004 | Toomey | 713/201 |
| 2005/0091537 A1* | 4/2005 | Nisbet et al. | 713/201 |
| 2006/0028558 A1* | 2/2006 | Sato et al. | 348/211.99 |
| 2006/0090082 A1* | 4/2006 | Apostolopoulos | 713/189 |
| 2006/0116969 A1* | 6/2006 | Hatanaka et al. | 705/71 |
| 2007/0162971 A1* | 7/2007 | Blom et al. | 726/17 |
| 2007/0192584 A1* | 8/2007 | Bajar et al. | 713/150 |
| 2007/0198364 A1 | 8/2007 | Quoc et al. | |
| 2007/0258623 A1* | 11/2007 | McGrath et al. | 382/104 |
| 2008/0113649 A1 | 5/2008 | Ibacache et al. | |

OTHER PUBLICATIONS

Confidentas GmbH; Audio and Video Encryption; Jun. 2007; Arlesheim, Switzerland; accessed on Feb. 8, 2008.
Codasystem, A la une, http://www.codasystem.com/, as accessed on Feb. 8, 2008.

* cited by examiner

*Primary Examiner* — Jason K Gee
(74) *Attorney, Agent, or Firm* — ALG Intellectual Property, LLC (57) ABSTRACT

A computer-implemented method for securely managing multimedia data captured by a mobile computing device is disclosed. The method may include (1) identifying a mobile computing device, (2) receiving multimedia data captured by the mobile computing device that has been encrypted using an asymmetric public key, (3) decrypting the multimedia data captured by the mobile computing device using an asymmetric private key, and (4) auditing the multimedia data captured by the mobile computing device. Various other methods, systems, and computer-readable media are also disclosed.

17 Claims, 9 Drawing Sheets

METHODS AND SYSTEMS FOR SECURELY MANAGING MULTIMEDIA DATA CAPTURED BY MOBILE COMPUTING DEVICES

CROSS REFERENCE TO RELATED APPLICATION

This application is a divisional of U.S. application Ser. No. 12/130,767, filed 30 May 2008, the disclosure of which is incorporated, in its entirety, by this reference.

BACKGROUND

An increasing number of mobile computing devices (such as cellular telephones) are now capable of capturing multimedia data, such as photo and video. While the ability to capture multimedia data in real time may represent an important tool for many organizations, IT management of such organizations may have little (if any) control over multimedia data captured by such devices.

For example, IT management may be unable to prevent a user of a mobile computing device from capturing sensitive data or information using the capturing capabilities of the mobile computing device and misusing the same, either intentionally or inadvertently. As such, the instant disclosure identifies a need for monitoring and controlling the multimedia capture capabilities of mobile computing devices.

SUMMARY

As will be described in greater detail below, the instant disclosure generally relates to systems and methods for securely managing multimedia data captured by mobile computing devices. For example, a method for securely managing multimedia data captured by a mobile computing device may comprise: 1) identifying multimedia data captured by the mobile computing device, 2) identifying a public key stored on the mobile computing device that corresponds to a private key stored on a server, 3) encrypting the multimedia data using the public key, and then 4) transmitting the encrypted multimedia data to the server. As will be described in greater detail below, this exemplary method may ensure that access to the multimedia data captured by the mobile computing device requires a decryption operation performed by a management server.

The multimedia data captured by the mobile computing device may be encrypted either before or immediately after it is written to storage of the mobile computing device. If the multimedia data is encrypted after it is written to storage of the mobile computing device, then any unencrypted version of the multimedia data may be removed or deleted from the mobile computing device. In certain embodiments, a lossy version of the multimedia data may be generated and stored in an unencrypted format on the mobile computing device. Such embodiments may allow a user of the device to easily identify multimedia data captured by the device without accessing a lossless version of the same.

A method for securely managing and authenticating multimedia data captured by a mobile computing device is also disclosed. In this example, the method may comprise: 1) identifying a mobile computing device, 2) receiving encrypted multimedia data from the mobile computing device that has been encrypted using a public key, 3) decrypting the encrypted multimedia data using a private key, and 4) auditing the decrypted multimedia data.

The multimedia data may be audited by determining whether the multimedia data contains sensitive information, filtering sensitive information from the multimedia data, transmitting a notification that identifies the presence of sensitive information in the multimedia data, identifying a source of origin of the multimedia data, routing the multimedia data, and/or archiving the multimedia data.

If a user of a mobile computing device desires to access the encrypted multimedia data stored on the mobile computing device, then the mobile computing device may transmit a request for a decrypted version of at least a portion of the encrypted multimedia data to a server. In response to this request, the server may: 1) transmit a decrypted version of at least a portion of the multimedia data to the mobile computing device if the multimedia data does not contain sensitive data, 2) if the multimedia data contains sensitive information, remove the sensitive information from the multimedia data and then transmit the remaining portion of the multimedia data to the mobile device, and/or 3) if the multimedia data contains sensitive information, decline to transmit the multimedia data to the mobile computing device.

A method for securely managing multimedia data captured by a mobile computing device is also disclosed. This method may comprise: 1) identifying multimedia data captured by a mobile computing device, 2) identifying an asymmetric public key stored on the mobile computing device that is associated with an asymmetric private key stored on a server, 3) encrypting the multimedia data using the asymmetric public key, and 4) transmitting the encrypted multimedia data to the server.

Systems and computer-readable media corresponding to the above-described methods are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure relates generally to systems and methods for securely managing multimedia data captured by a mobile computing device. The phrase "multimedia data," as used herein generally refers to any type or form of audio, video, or photo data. Similarly, the phrase "mobile computing device" may refer to any computing device capable of capturing multimedia data. Examples of mobile computing devices include, without limitation, cellular phones, personal digital assistants (PDA), digital cameras, digital camcorders, multimedia players, combinations of one or more of the same, or any other suitable mobile computing device.

Figure 1:
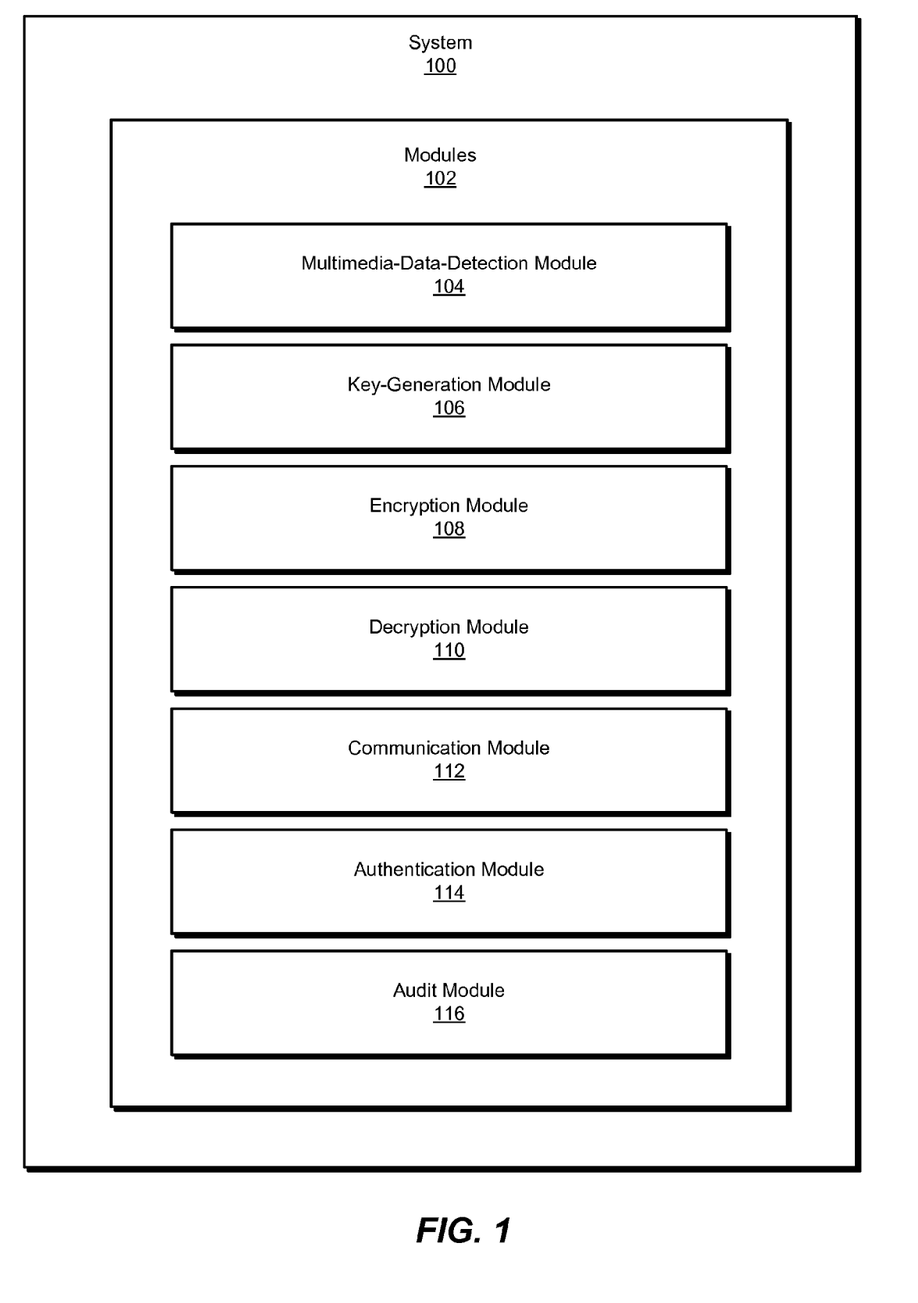
FIG. 1 is a block diagram of an exemplary system for securely managing multimedia data captured by mobile computing devices according to at least one embodiment.
Figure 2:
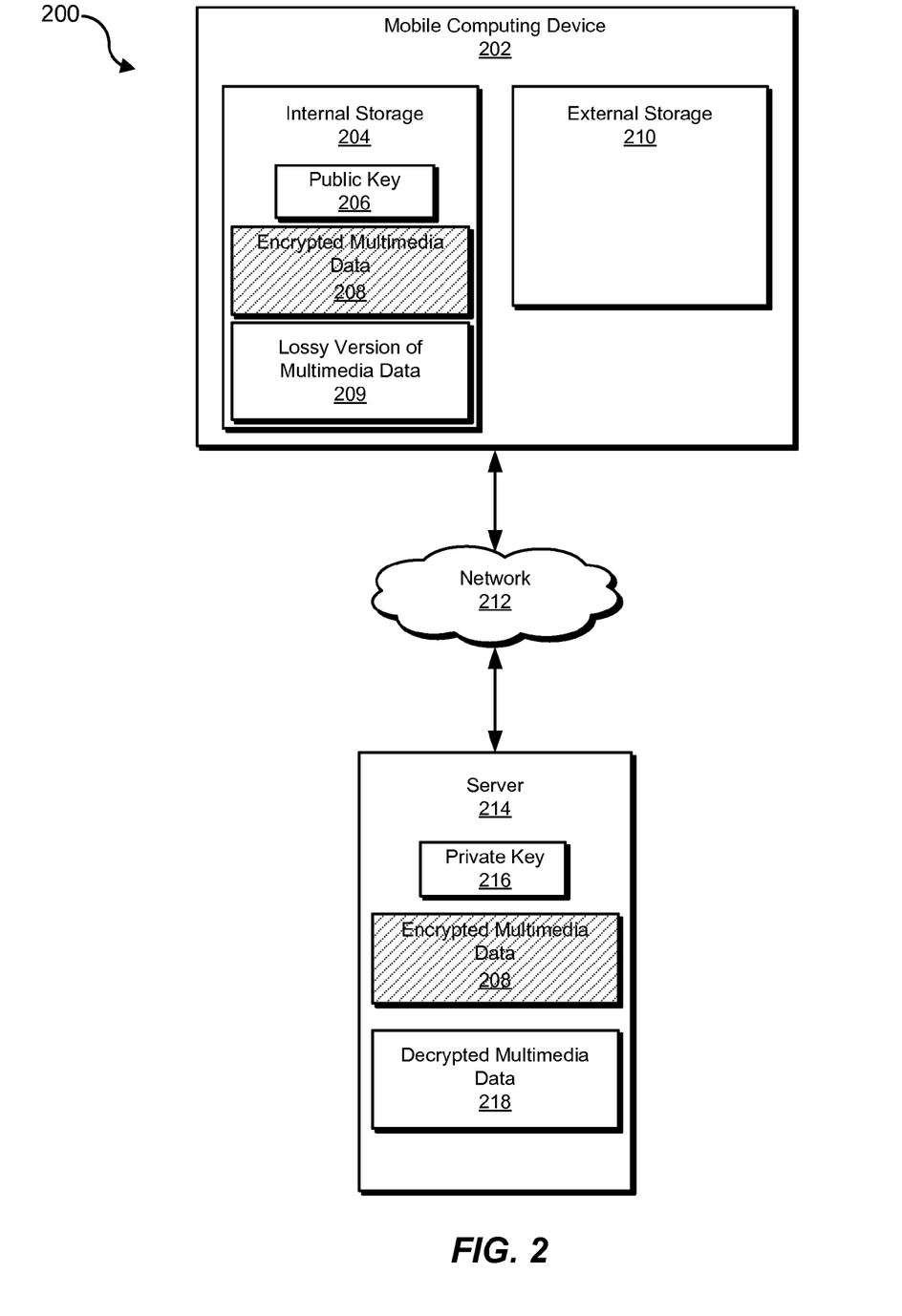
FIG. 2 is a block diagram of an exemplary network-based system for securely managing multimedia data captured by mobile computing devices according to at least one embodiment.

The following will provide, with reference to FIGS. 1 and 2 detailed descriptions of an exemplary system for securely managing multimedia data captured by mobile computing devices. Descriptions of an exemplary computing system and an exemplary network architecture capable of implementing one or more of the embodiments described and/or illustrated herein will also be provided in connection with FIGS. 8 and 9. Detailed descriptions of corresponding exemplary computer-implemented methods will also be provided in connection with FIGS. 3-7.

FIG. 1 is a block diagram of an exemplary system 100 for securely managing multimedia data captured by mobile computing devices. As illustrated in this figure, exemplary system 100 may comprise one or more modules 102 for performing one or more tasks. For example, exemplary system 100 may comprise a multimedia-data-detection module 104 for detecting or identifying multimedia data captured by a mobile computing device. Exemplary system 100 may also comprise a key-generation module 106 for generating public and private keys that may be used to encrypt and/or decrypt multimedia data, as will be described in greater detail below.

In addition, exemplary system 100 may comprise an encryption module 108 for encrypting multimedia data captured by a mobile computing device and a decryption module 110 for decrypting encrypted multimedia data. Exemplary system 100 may also comprise a communication module 112 for facilitating communication between a mobile computing device and a server. Exemplary system 100 may also comprise an authentication module 114 for authenticating mobile computing devices with a server. In addition, exemplary system 100 may comprise an audit module 116 for auditing multimedia data captured by a mobile computing device.

In certain embodiments, one or more of modules 102 may represent one or more software applications or programs that, when executed by a computing device, may cause the computing device to perform one or more tasks required to securely manage multimedia data captured by a mobile computing device. For example, as will be described in greater detail below, one or more of modules 102 may represent software modules configured to run on one or more computing devices, such as mobile computing device 202 in FIG. 2, server 214 in FIG. 2, exemplary computing system 810 in FIG. 8, and/or portions of exemplary network architecture 900 in FIG. 9. One or more of modules 102 may also represent all, or portions of, one or more special-purpose computers configured to perform one or more tasks required to securely manage multimedia data captured by mobile computing devices.

Exemplary system 100 in FIG. 1 may be deployed in a variety of ways. For example, all or a portion of exemplary system 100 in FIG. 1 may represent portions of a mobile computing device in communication with a server via a network, as illustrated in FIG. 2. As illustrated in this figure, exemplary system 200 may comprise a mobile computing device 202 in communication with a server 214 via a network 212.

Mobile computing device 202 generally represents any type or form of mobile computing device capable of executing computer-readable instructions. As detailed above, examples of mobile computing device 202 include, without limitation, a cellular telephone, a PDA, a digital camera, a digital camcorder, a multimedia player, combinations of one or more of the same, or the like. In certain embodiments, mobile computing device 202 may comprise one or more portions of exemplary system 100 in FIG. 1. For example, one or more of modules 102 in FIG. 1 may be stored and configured to run on mobile computing device 202.

In at least one embodiment, mobile computing device 202 may communicate with server 214 via network 212. Network 212 generally represents any type or form of communication, telecommunication, or computing network. Examples of network 212 include, without limitation, a telecommunications network, an intranet, a wide area network (WAN), a local area network (LAN), a personal area network (PAN), or the Internet.

As illustrated in FIG. 2, exemplary system 200 may also comprise a server 214. Server 214 generally represents any type or form of server-side computing device, such as a back-end. In certain embodiments, server 214 may comprise one or more portions of exemplary system 100 in FIG. 1. For example, one or more of modules 102 in FIG. 1 may be stored and configured to run on server 214.

Figure 3:
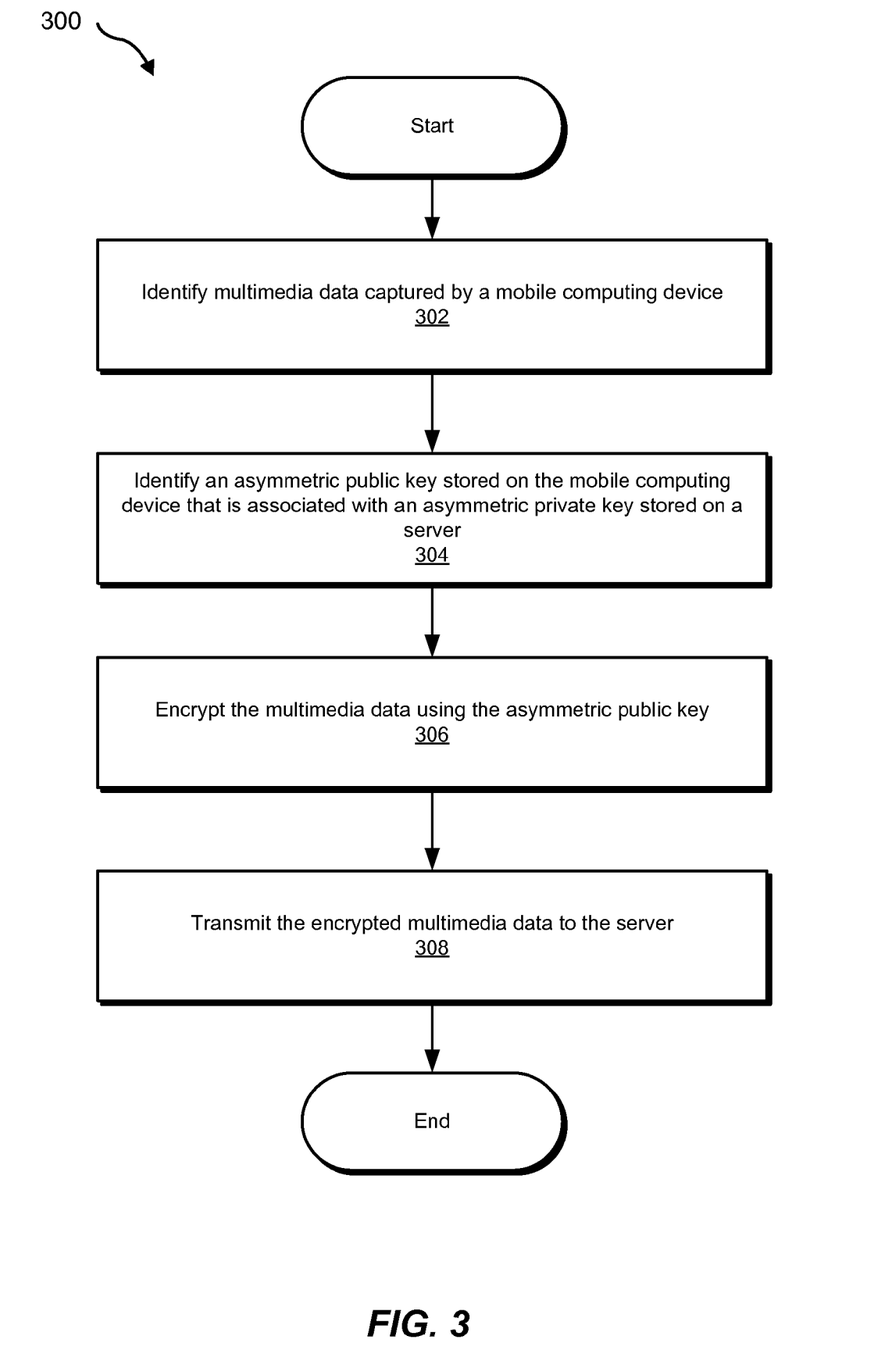
FIG. 3 is a flow diagram of an exemplary computer-implemented method for securely managing multimedia data captured by a mobile computing device according to at least one embodiment.

FIG. 3 is a flow diagram of an exemplary computer-implemented method 300 for securely managing multimedia data captured by a mobile computing device. As illustrated in this figure, at step 302 multimedia data captured by a mobile computing device may be identified. For example, multimedia-data-detection module 104 in FIG. 1 may identify multimedia data captured by mobile computing device 202 in FIG. 2. Step 302 may be performed in a variety of ways. For example, as will be described in connection with FIG. 4 below, multimedia-data-detection module 104 may identify multimedia data captured by the mobile computing device either before it is written to storage or immediately after it is written to storage of the mobile computing device.

At step 304, an asymmetric public key stored on the mobile computing device may be identified. Asymmetric cryptography, also know as public-key cryptography, generally refers to a form of cryptography that utilizes a private key that is mathematically related to, but cannot be practically derived from, a public key. In asymmetric cryptography, data encrypted using the public key may only be decrypted (at least feasibly) using the corresponding private key.

Step 304 in FIG. 3 may be performed in a variety of ways. For example, encryption module 108 in FIG. 1 may identify public key 206 stored within internal storage 204 on mobile computing device 202 in FIG. 2. In at least one embodiment, public key 206 stored on mobile computing device 202 may be associated with (i.e., related mathematically to) an asymmetric private key 216 stored on server 214 in FIG. 2. In certain embodiments, public key 206 stored on mobile computing device 202 may be generated by a key-generation module, such as key-generation module 106 in FIG. 1, stored on server 214 in FIG. 2. For example, upon registering mobile computing device 202 with server 214, key-generation module 106 stored on server 214 may generate public key 206 for mobile computing device 202 using private key 216 on server 214. Any type or form of asymmetric key-generation algorithm, heuristic, or technique may be used to generate public key 206. Examples for suitable asymmetric-key-generation algorithms include, without limitation, RSA, Cramer-Shoup, or the like.

As detailed above, public key 206 may be stored within internal storage 204 of mobile computing device 202 in FIG. 2. Public key 206 may be stored on mobile computing device 202 in a variety of ways. For example, public key 206 may be securely stored on mobile computing device 202 using a device-specific storage protocol, an operating-system-specific storage protocol, an application-specific storage protocol, a trusted platform module (TPM), or the like.

Returning to FIG. 3, at step 306 the multimedia data identified in step 302 may be encrypted using the asymmetric public key identified in step 304. For example, encryption module 108 in FIG. 1 may encrypt multimedia data captured by mobile computing device 202 in FIG. 2, resulting in encrypted multimedia data 208. In this example, encrypted multimedia data 208 may only be decrypted using private key 216 stored on server 214. As illustrated in FIG. 2, encrypted multimedia data 208 may be stored within internal storage 204 and/or external storage 210 (which may represent an external memory card) of mobile computing device 202.

In at least one embodiment, exemplary method 300 in FIG. 3 may also comprise, after encrypting the multimedia data using the public key in step 306, generating a lossy version of the multimedia data and then storing this lossy version in an unencrypted format on the mobile computing device. For example, exemplary system 100 in FIG. 1 may generate lossy version of multimedia data 209 (such as a lossy thumbnail of a picture taken by mobile computing device 202) and then store the same on mobile computing device 202. In this example, lossy version 209 may allow a user of mobile computing device 202 to appropriately identify multimedia data captured by mobile computing device 202 without allowing the user to access the lossless version of the multimedia data.

At step 308, the encrypted multimedia data may be transmitted to the server. For example, communication module 112 in FIG. 1 may cause mobile computing device 202 in FIG. 2 to transmit encrypted multimedia data 208 to server 214 via network 212. Step 308 may be performed in a variety of ways. For example, communication module 112 in FIG. 1 may transmit encrypted multimedia data 208 in FIG. 2 using a communications device that is integrated with mobile computing device 202 (such as a cellular telephone antenna integrated with a cellular telephone). In an additional embodiment, mobile computing device 202 in FIG. 2 may be connected to an external communications device (such as a docking station for a PDA connected to a personal computer that is connected to a network, such as network 212) and then transmit encrypted multimedia data 208 to server 214 using the external communications device. Upon completion of step 308 in FIG. 3, exemplary method 300 may terminate.

Figure 4:
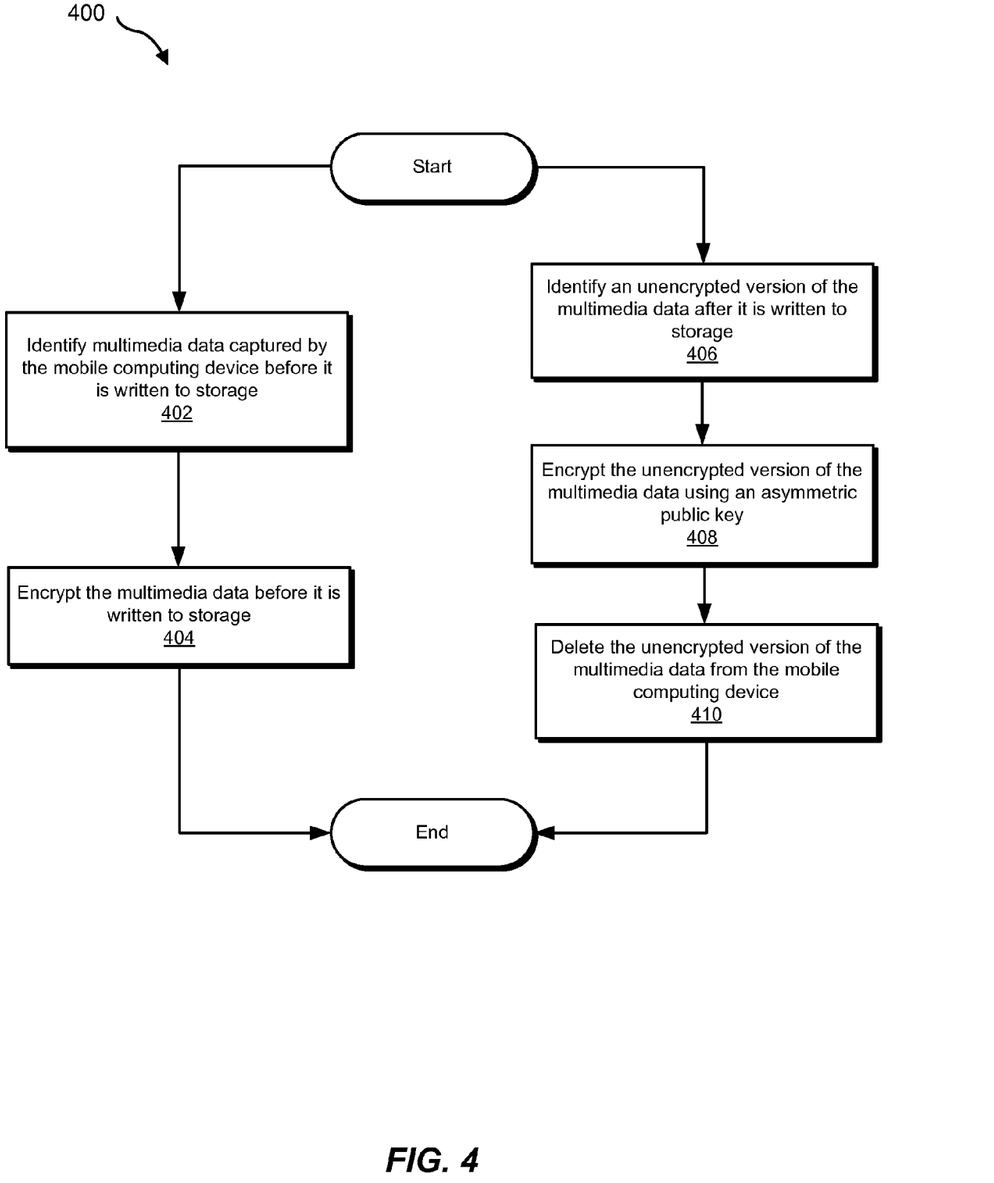
FIG. 4 is a flow diagram of an exemplary computer-implemented method for encrypting multimedia data captured by a mobile computing device according to at least one embodiment.

As detailed above, multimedia data captured by mobile computing device 202 may be encrypted either before or immediately after it is written to storage. FIG. 4 is a flow diagram of an exemplary computer-implemented method 400 for encrypting multimedia data captured by a mobile computing device. As illustrated in this figure, at step 402 multimedia data captured by the mobile computing device may be identified before it is written to storage. For example, multimedia-data-detection module 104 in FIG. 1 may identify multimedia data captured by mobile computing device 202 before the multimedia data is written to internal storage 204 or external storage 210. Multimedia data captured by a mobile computing device may be identified before it is written to storage in a variety of ways. For example, multimedia data detection module 104 in FIG. 1 may identify multimedia data streams captured by mobile computing device 202 at the device-driver level or at the operating-system level.

At step 404, the multimedia data identified in step 402 may be encrypted before it is written to storage of the mobile computing device. For example, encryption module 108 in FIG. 1 may encrypt the multimedia data stream captured by mobile computing device 202 before the data stream is written to either internal storage 204 or external storage 210 of mobile computing device 202. The resulting encrypted multimedia data 208 may then be stored either in internal storage 204 or external storage 210 of mobile computing device 202. Upon completion of step 404, exemplary method 400 may terminate.

Alternatively, at step 406 an unencrypted version of multimedia data captured by a mobile computing device may be identified immediately after it is stored on the mobile computing device. For example, multimedia-data-detection module 104 in FIG. 1 may identify a multimedia data stream captured by mobile computing device 202 at the application level after the multimedia data stream has been stored on either internal storage 204 or external storage 210 of mobile computing device 202. In this example, since the multimedia data stream is identified at the application level, only a fraction of a second may have occurred between the time when the multimedia data was captured by the mobile computing device and when it was stored on the mobile computing device.

At step 408, the unencrypted version of the multimedia data may be encrypted using an asymmetric public key. For example, encryption module 108 in FIG. 1 may encrypt the unencrypted version of the multimedia data captured by mobile computing device 202 using public key 206, resulting in encrypted multimedia data 208. At step 410, the unencrypted version of the multimedia data may be deleted from the mobile computing device. For example, encryption module 108 in FIG. 1 may delete the unencrypted version of the multimedia data identified in step 406 from mobile computing device 202. Upon completion of step 410, exemplary method 400 in FIG. 4 may terminate.

Figure 5:
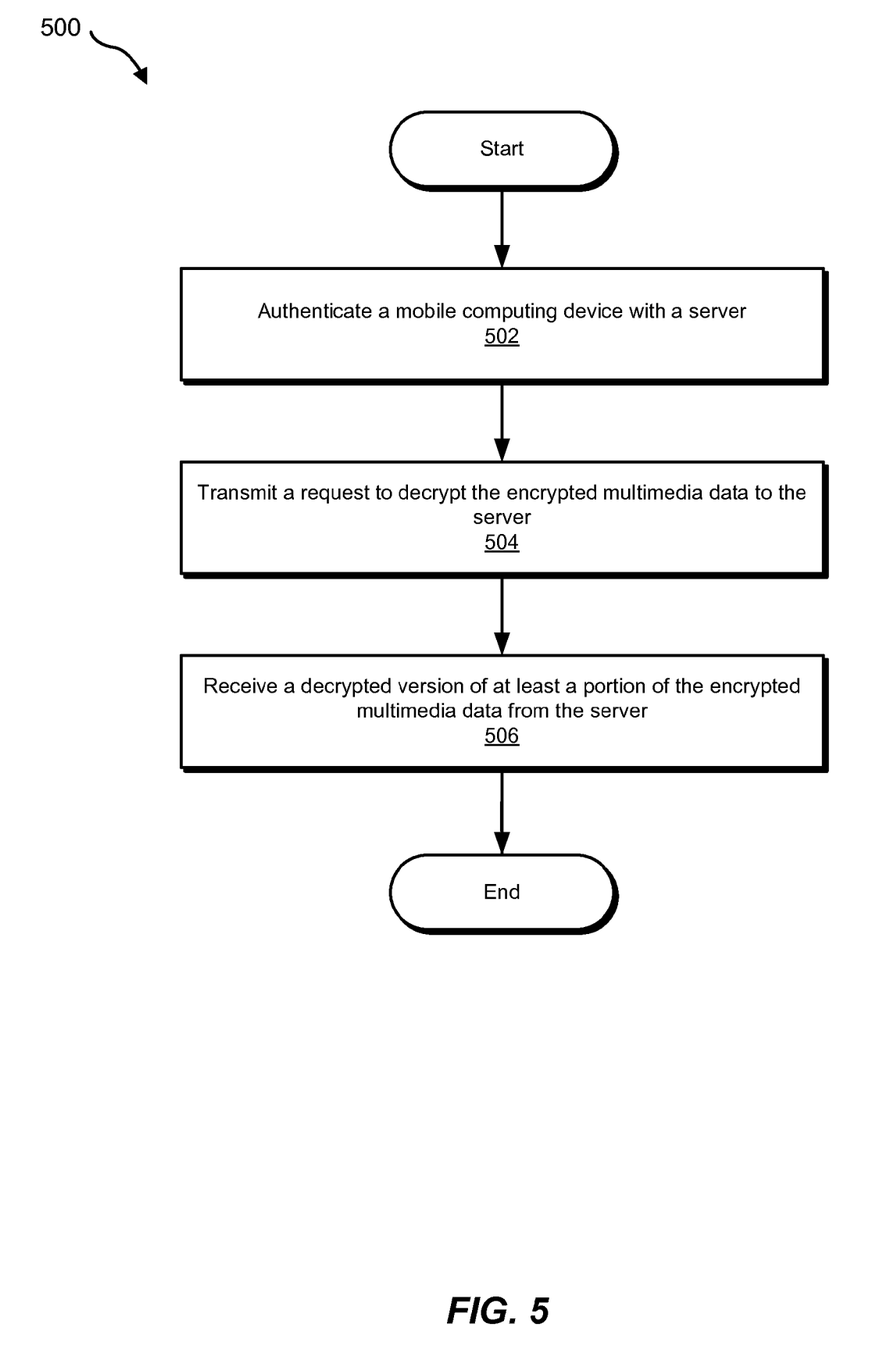
FIG. 5 is a flow diagram of an exemplary computer-implemented method for decrypting encrypted multimedia data stored on a mobile computing device according to at least one embodiment.

As detailed above, exemplary methods 300 and 400 may prevent decryption of encrypted multimedia data stored on a mobile computing device without accessing a private key stored on a server. FIG. 5 is a flow diagram of an exemplary computer-implemented method 500 for decrypting encrypted multimedia data stored on a mobile computing device using a private key stored on a server. As illustrated in this figure, at step 502 a mobile computing device may be authenticated with a server. For example, authentication module 114 in FIG. 1 may authenticate mobile computing device 202 in FIG. 2 with server 214. A mobile computing device may be authenticated in a variety of ways. For example, a mobile computing device may be authenticated with a server by transmitting device-specific information associated with the mobile computing device to the server.

At step 504, a request to decrypt the encrypted multimedia data may be transmitted to the server. For example, communication module 112 in FIG. 1 may cause mobile computing device 202 in FIG. 2 to transmit a request to decrypt encrypted multimedia data 208 to server 214 via network 212. At step 506, a decrypted version of at least a portion of the encrypted multimedia data may be received from the server. For example, mobile computing device 202 may receive, via communication module 112, decrypted multimedia data 218 from server 214 via network 212. As will be described in greater detail below, encrypted multimedia data 208 may be decrypted using private key 216 and then stored on server 214, resulting in decrypted multimedia data 218. Upon completion of step 506, exemplary method 500 may terminate.

As detailed above, the exemplary systems and methods described herein may prevent users of mobile computing devices from accessing, reproducing, transmitting, or otherwise utilizing multimedia data captured by such mobile computing devices without participating in a decryption process managed by a server. As such, the exemplary systems and methods described herein may prevent users from intentionally or inadvertently misusing sensitive data contained within the multimedia data captured by the mobile computing device.

Figure 6:
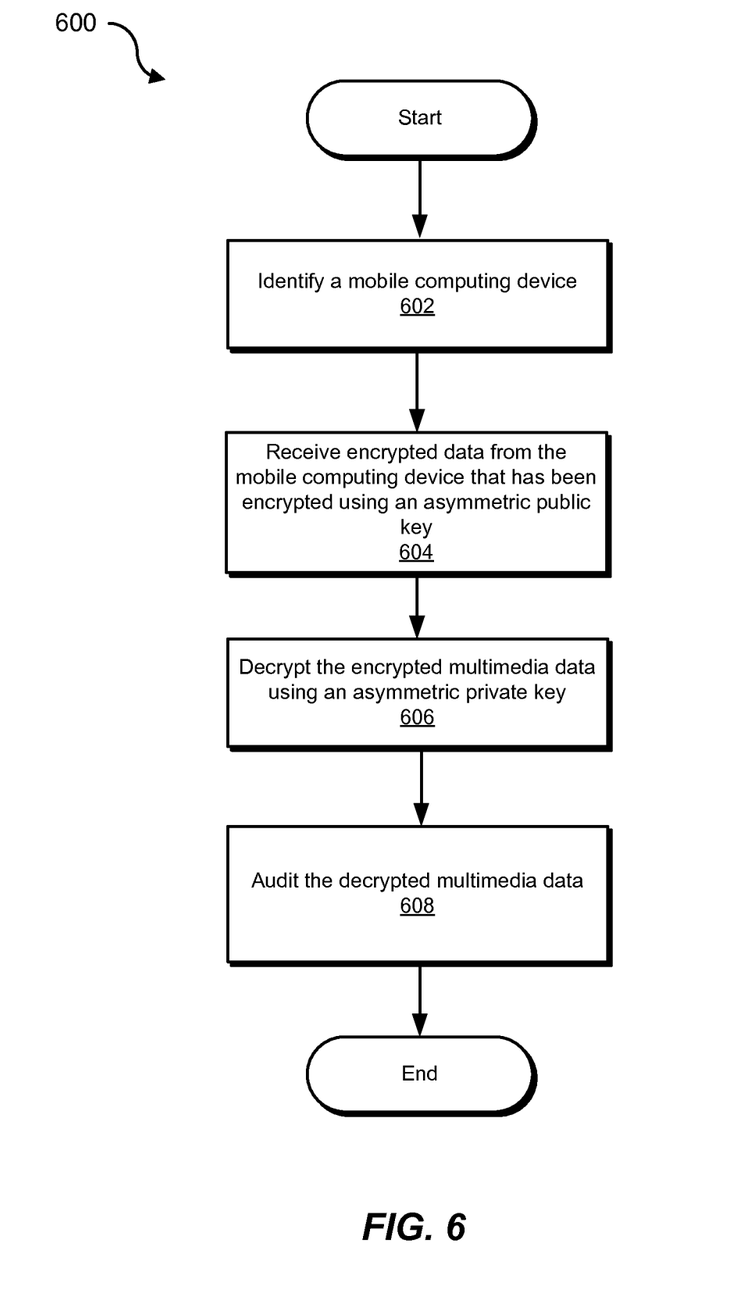
FIG. 6 is a flow diagram of an exemplary computer-implemented method for securely managing multimedia data captured by mobile computing devices according to at least one embodiment.

As detailed above, the exemplary systems and methods described herein may enable an enterprise to audit multimedia data captured by mobile computing devices within the enterprise. FIG. 6 is a flow diagram of an exemplary computer-implemented method 600 for securely managing multimedia data captured by mobile computing devices. As illustrated in this figure, at step 602 a mobile computing device may be identified. Step 602 may be performed in a variety of ways. For example, authentication module 114 in FIG. 1 may cause server 214 in FIG. 2 to enroll or register mobile computing device 202. During this registration process, key-generation module 106 may generate, and communication module 112 may cause server 214 to transmit, public key 206 to mobile computing device 202.

At step 604, multimedia data captured by the mobile computing device that has been encrypted using an asymmetric public key may be received. For example, server 214 in FIG. 2 may receive encrypted multimedia data 208 from mobile computing device 202 via network 212. At step 606, the encrypted multimedia data received in step 604 may be decrypted using an asymmetric private key that is associated with the asymmetric public key used to encrypt the encrypted multimedia data received in step 604. For example, decryption module 110 stored on server 214 may decrypt encrypted multimedia data 208 received from mobile computing device 202 using private key 216. The resulting decrypted multimedia data (in this example, decrypted multimedia data 218) may then be stored on server 214.

At step 608, the decrypted multimedia data may be audited. For example, audit module 116 may cause server 214 to audit the decrypted multimedia data 218. Step 608 may be performed in a variety of ways. For example, audit module 116 may audit data 218, determine whether data 218 contains sensitive information, filter data 218, identify a source of origin for data 218, route data 218, and/or transmit a notification that identifies the presence of sensitive information in data 218. The term "audit," as used herein, may refer to any type or form of evaluation of data. In at least one embodiment, upon auditing the multimedia data in step 608, audit module 116 in FIG. 1 may generate an audit log that identifies one or more actions performed by audit module 116. Upon completion of step 608 in FIG. 6, exemplary method 600 may terminate.

Figure 7:
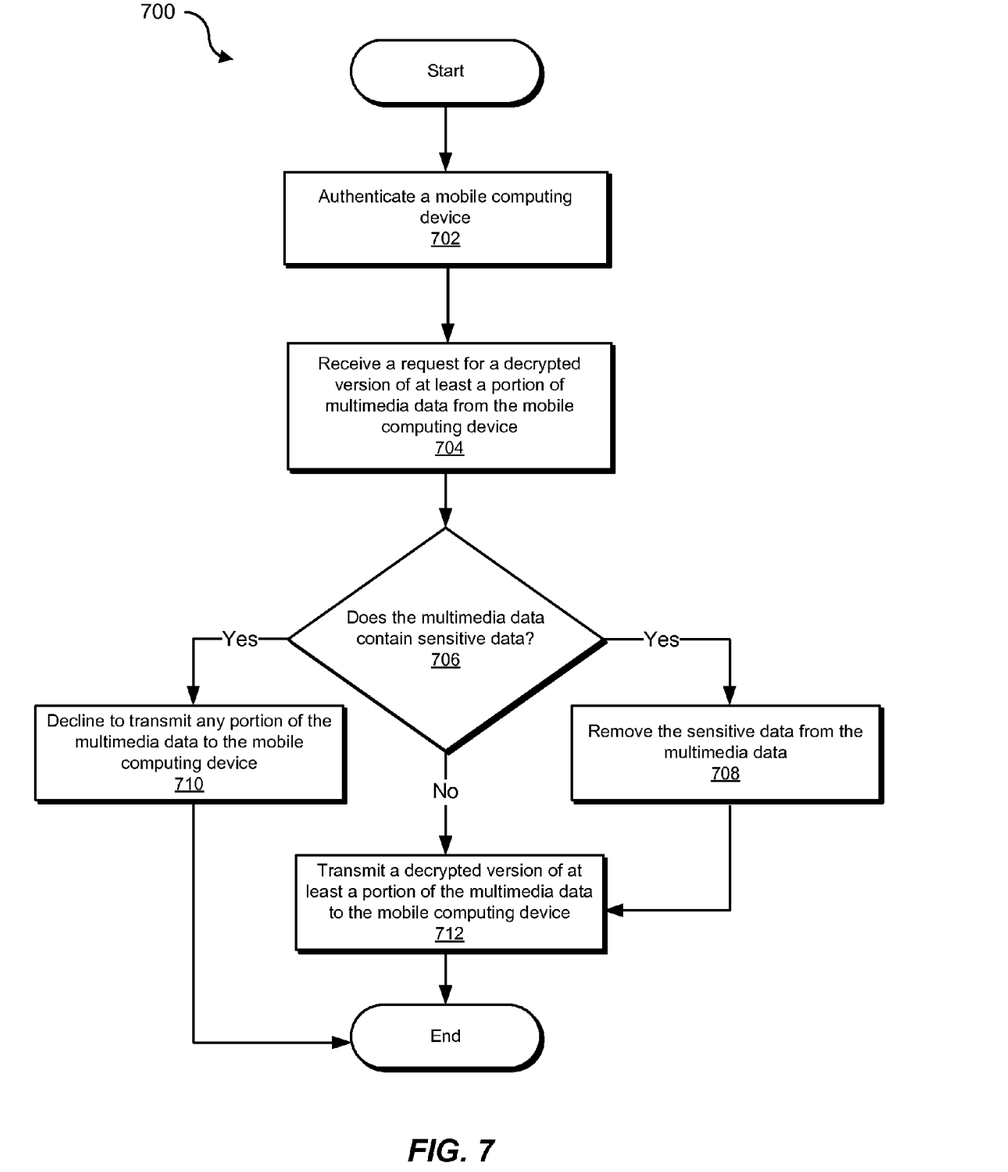
FIG. 7 is a flow diagram of an exemplary computer-implemented method for performing various actions based on the multimedia data according to at least one embodiment.

As detailed above, in certain embodiments auditing the multimedia data captured by the mobile computing device may comprise determining whether the multimedia data contains sensitive information. FIG. 7 is a flow diagram of an exemplary computer-implemented method 700 for performing various actions based on whether the multimedia data captured by the mobile computing device contains sensitive data. As illustrated in this figure, at step 702 a mobile computing device may be authenticated. For example, authentication module 114 in FIG. 1 stored on server 214 may authenticate mobile computing device 202 with server 214.

At step 704, a request for a decrypted version of at least a portion of multimedia data may be received from the mobile computing device. For example, server 214 in FIG. 2 may receive a request for decrypted multimedia data 218 from mobile computing device 202 via network 212. At step 706, audit module 116, stored on server 214, may determine whether decrypted multimedia data 218 contains sensitive data. Step 706 may be performed in a variety of ways. For example, audit module 116 may calculate a hash or checksum for all or a portion of decrypted multimedia data 218 and then compare the hash or checksum with a known hash or checksum for sensitive data.

If audit module 116 determines that the multimedia data contains sensitive data at step 706, then control may proceed to step 708 or step 710. At step 708, the sensitive data identified in step 706 may be removed from the multimedia data. For example, audit module 116 in FIG. 1 may remove sensitive data from decrypted multimedia data 218 stored on server 214. Control may then proceed to step 712.

In an additional embodiment, at step 710 the system may decline to transmit any portion of the multimedia data to the mobile computing device. For example, audit module 116 may prevent server 214 from transmitting any portion of decrypted multimedia data 218 to mobile computing device 202. Upon completion of step 710, control of exemplary method 700 may terminate.

If, at step 706, audit module 116 determines that the multimedia data does not contain sensitive data, then control may proceed to step 712. At step 712, a decrypted version of at least a portion of multimedia data may be transmitted to the mobile computing device. For example, communication module 112 in FIG. 1 may cause server 214 to transmit at least a portion of decrypted multimedia data 218 to mobile computing device 202 via network 212. Upon completion of step 712, exemplary method 700 may terminate.

As detailed above, the exemplary systems and methods described herein may prevent users of mobile computing device from accessing, reproducing, or otherwise utilizing multimedia data that has not been audited by a management server. In certain embodiments, such exemplary systems and methods may prevent sensitive data captured in the form of multimedia data from being inadvertently or intentionally misused.

Figure 8:
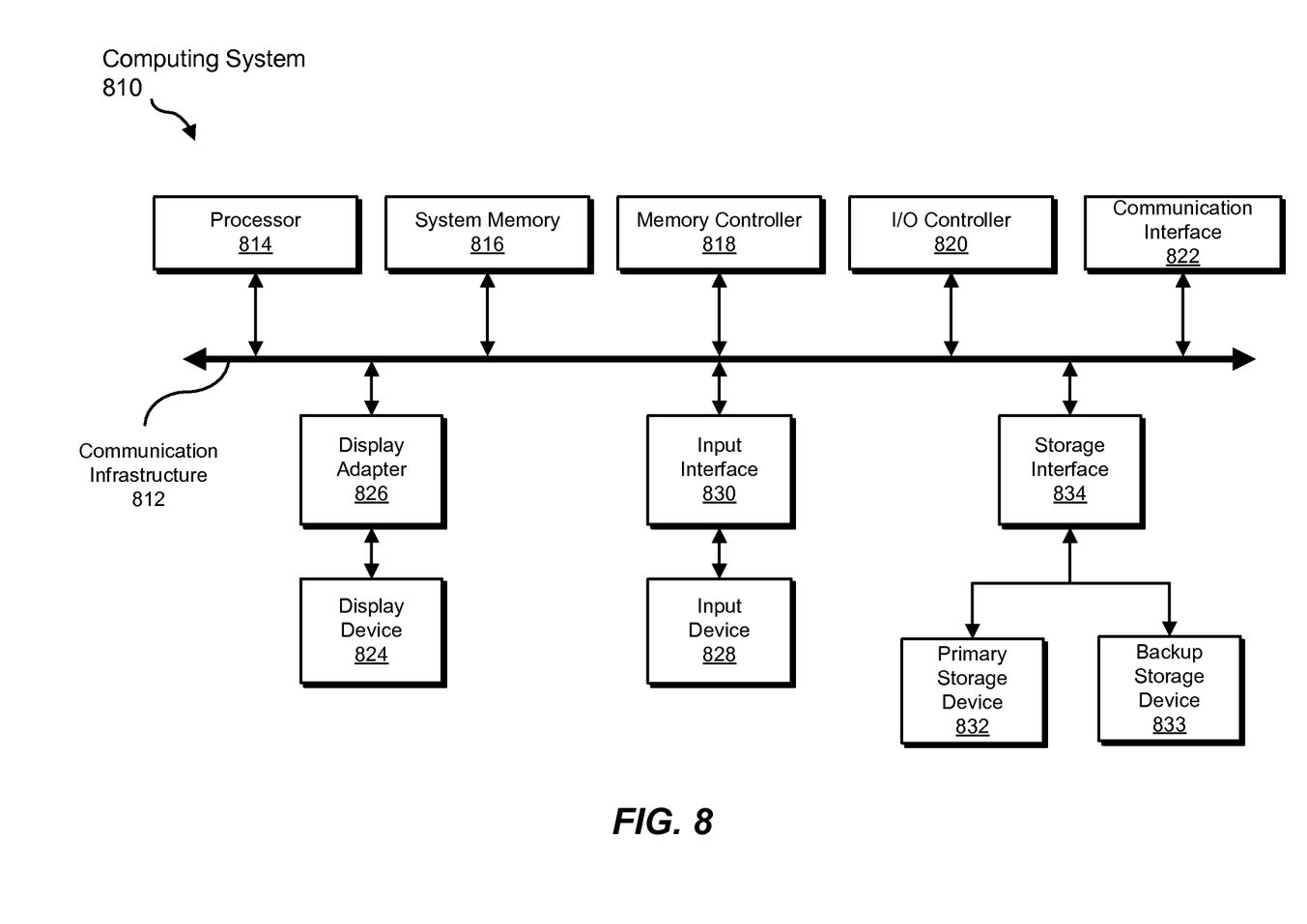
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, encrypting, transmitting, deleting, registering, receiving, storing, transmitting, authenticating, generating, connecting, auditing, determining, archiving, filtering, routing, assigning, removing steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, encrypting, transmitting, deleting, registering, receiving, storing, transmitting, authenticating, generating, connecting, auditing, determining, archiving, filtering, routing, assigning, removing.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for identifying, encrypting, transmitting, deleting, registering, receiving, storing, transmitting, authenticating, generating, connecting, auditing, determining, archiving, filtering, routing, assigning, removing steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, encrypting, transmitting, deleting, registering, receiving, storing, transmitting, authenticating, generating, connecting, auditing, determining, archiving, filtering, routing, assigning, removing steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, encrypting, transmitting, deleting, registering, receiving, storing, transmitting, authenticating, generating, connecting, auditing, determining, archiving, filtering, routing, assigning, removing steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, the exemplary file systems disclosed herein may be stored on primary storage device 832, while the exemplary file-system backups disclosed herein may be stored on backup storage device 833. Storage devices 832 and 833 may also be used, for example, to perform and/or be a means for performing, either alone or in combination with other elements, one or more of the identifying, encrypting, transmitting, deleting, registering, receiving, storing, transmitting, authenticating, generating, connecting, auditing, determining, archiving, filtering, routing, assigning, removing steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
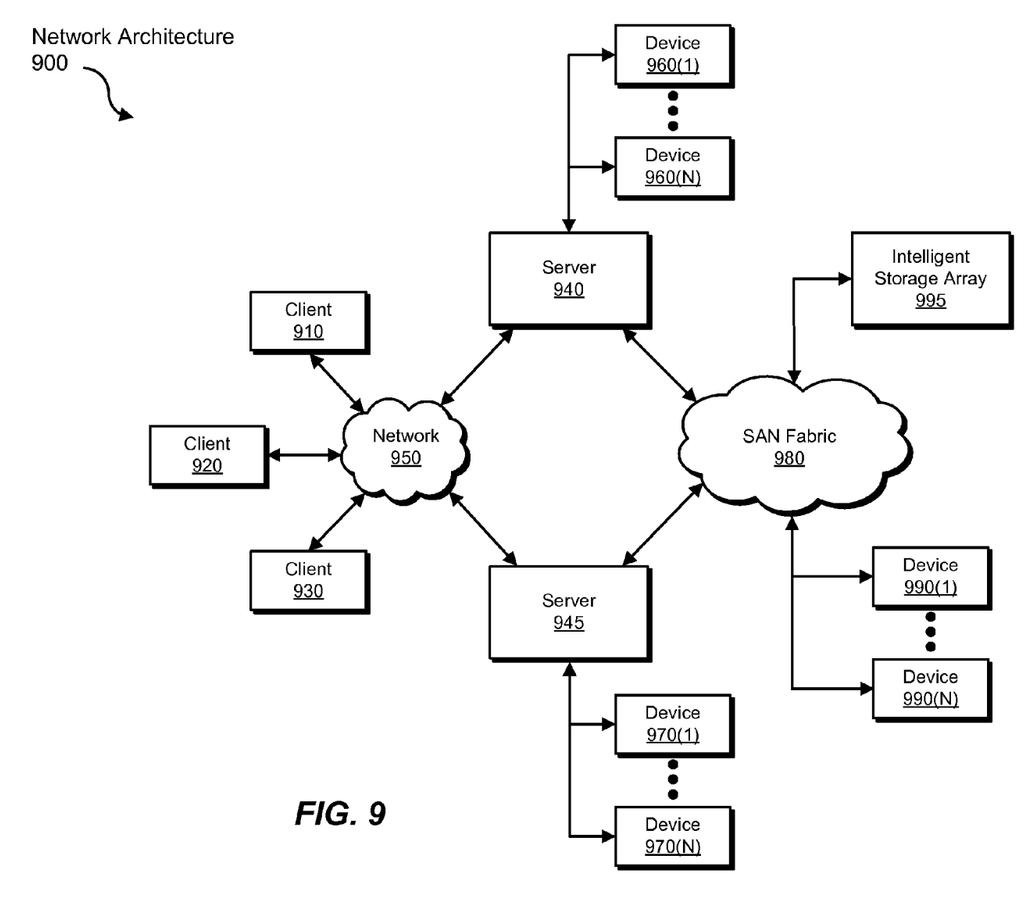
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or to run certain software applications. Network 950 generally represents any telecommunication or computer network; including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, encrypting, transmitting, deleting, registering, receiving, storing, transmitting, authenticating, generating, connecting, auditing, determining, archiving, filtering, routing, assigning, removing steps disclosed herein. Network architecture 900 may also be used to perform and/or be a means for performing other steps and features set forth in the instant disclosure.

As detailed above, computing system 810 and/or one or more of the components of network architecture 900 may perform and/or be a means for performing either alone or in combination with other elements, one or more of the exemplary methods described and/or illustrated herein. For example, a computer-implemented method for securely managing multimedia data captured by a mobile computing device may comprise identifying multimedia data, identifying an asymmetric public key stored on the mobile computing device, encrypting the multimedia data using the asymmetric public key, and transmitting the encrypted multimedia data to a server. The mobile computing device may comprise a cellular phone, a personal digital assistant, a digital camera, a digital camcorder, a multimedia player, combinations of one or more of the same, and/or any other device capable of capturing multimedia data.

In certain embodiments, encrypting the multimedia data may comprise encrypting the multimedia data before it is written to storage of the mobile computing device. Encrypting the multimedia data may comprise identifying an unencrypted version of the multimedia data stored on the mobile computing device, encrypting the unencrypted version of the multimedia data using the asymmetric public key, and then deleting the unencrypted version of the multimedia data from the mobile computing device.

In at least one embodiment, identifying the asymmetric public key may comprise registering the mobile computing device with the server, receiving the asymmetric public key from the server, and securely storing the asymmetric public key on the mobile computing device. Furthermore, securely storing the asymmetric public key on the mobile computing device may comprise using a device-specific storage protocol, an operating-system-specific protocol, an application-specific protocol, and/or a trusted platform module.

In certain embodiments, the mobile computing device may transmit a request to decrypt the encrypted multimedia data to the server. In response, the mobile computing device may receive a decrypted version of at least a portion of the multimedia data from the server. Moreover, the encrypted multimedia may also be stored on the mobile computing device, in internal and/or external memory (e.g., a memory card). In at least one embodiment, prior to receipt of the decrypted version of at least a portion of the encrypted multimedia data from the server, the server may authenticate the mobile computing device.

In an additional embodiment, the mobile computing device may generate a lossy version of the multimedia data, which may be stored in an unencrypted format on the mobile computing device. The lossy version of the multimedia data may be accessed independently, with or without access to any lossless version of the same.

In other embodiments, the mobile computing device may transmit the encrypted multimedia data to the server using a communications device that is integrated with the mobile computing device. Alternatively, the mobile computing device may connect to an external communications device and transmit the encrypted multimedia data to the server using the external communications device.

In certain embodiments, a method for securely managing multimedia data captured by mobile computing devices may comprise identifying a mobile computing device, receiving multimedia data captured by the mobile computing device and encrypted using an asymmetric public key, decrypting the multimedia data with an asymmetric private key, and auditing the multimedia data. Furthermore, receiving encrypted multimedia data from the mobile computing device may comprise receiving a request for at least a portion of a decrypted version of the multimedia data.

As mentioned, an audit may be performed on the multimedia data. Following the audit, the decrypted version of at least a portion of the multimedia data may be transmitted to the mobile computing device. The mobile computing device may be authenticated prior to transmitting the decrypted version of at least a portion of the multimedia data. In addition, if sensitive data is discovered during the audit, the sensitive data may be removed from the multimedia data prior to transmitting.

A system for securely managing multimedia data captured by mobile computing devices may comprise a variety of components and modules. In at least one embodiment, a system for securely managing multimedia data captured by mobile computing devices may comprise a mobile computing device capable of capturing multimedia data, a server in communication with the mobile computing device, an asymmetric private key stored on the server, and an asymmetric public key stored on the mobile computing device.

In some embodiments, an audit of the multimedia data may comprise archiving the multimedia data, determining whether the multimedia data contains sensitive information, filtering the multimedia data, identifying a source of origination for the multimedia data, routing the multimedia data, and/or transmitting a notification that identifies the presence of sensitive information to the mobile computing device. An audit may also comprise an audit log. In addition, identifying the mobile computing device may comprise registering the mobile computing device, assigning the asymmetric public key to the mobile computing device, and transmitting the asymmetric public key to the mobile computing device. In certain embodiments, upon receiving a request for a decrypted version of the multimedia data, it may be determined that the multimedia data contains sensitive data and as such, the decrypted version of the multimedia data may be denied transmission to the mobile computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securely managing multimedia data captured by mobile computing devices, at least a portion of the method being performed by a server-side computing device comprising at least one processor, the method comprising:
   identifying a mobile computing device;
   receiving multimedia data captured by the mobile computing device, the multimedia data having been:
      identified within a multimedia data stream on at least one of a device-driver level and an operating-system level of the mobile computing device;
      in response to being identified within the multimedia data stream, encrypted using an asymmetric public key before being written to storage within the mobile computing device;
   decrypting the multimedia data captured by the mobile computing device using an asymmetric private key;
   auditing the multimedia data captured by the mobile computing device;
   receiving, from the mobile computing device, a request for a decrypted version of the multimedia data;
   determining that the multimedia data contains sensitive information;
   in response to determining that the multimedia data contains the sensitive information, removing, at the server-side computing device, the sensitive information from the multimedia data;
   authenticating the mobile computing device;
   after removing the sensitive information from the multimedia data and authenticating the mobile computing device, transmitting a revised version of the multimedia data to the mobile computing device.

2. The method of claim 1, wherein auditing the multimedia data captured by the mobile computing device comprises at least one of:
   archiving the multimedia data;
   filtering the multimedia data;
   identifying a source of origination for the multimedia data;
   routing the multimedia data;
   transmitting a notification that identifies the presence of the sensitive information in the multimedia data.

3. The method of claim 1, wherein identifying the mobile computing device comprises:
   registering the mobile computing device;
   assigning the asymmetric public key to the mobile computing device;
   transmitting the asymmetric public key to the mobile computing device.

4. The method of claim 1, further comprising generating a lossy version of the multimedia data.

5. The method of claim 1, wherein authenticating the mobile computing device comprises the mobile computing device transmitting device-specific information associated with the mobile computing device to the server-side computing device.

6. The method of claim 1, wherein the asymmetric public key used to encrypt the multimedia data is securely stored on the mobile computing device using at least one of a device-specific storage protocol, an operating-system-specific storage protocol, an application-specific storage protocol, and a trusted platform module.

7. The method of claim 1, wherein determining that the multimedia data contains sensitive information comprises:
   calculating a hash and/or checksum for at least a portion of the multimedia data;
   comparing the hash and/or checksum with a known hash and/or checksum for sensitive data.

8. The method of claim 1, wherein auditing the multimedia data comprises generating an audit log.

9. A system for securely managing multimedia data captured by mobile computing devices, the system comprising:
   an authentication module programmed to identify a mobile computing device;

a communication module programmed to receive multimedia data captured by the mobile computing device, the multimedia data having been:
  identified within a multimedia data stream on at least one of a device-driver level and an operating-system level of the mobile computing device;
  in response to being identified within the multimedia data stream, encrypted using an asymmetric public key before being written to storage within the mobile computing device;
a decryption module programmed to decrypt the multimedia data captured by the mobile computing device using an asymmetric private key;
an audit module programmed to audit the multimedia data captured by the mobile computing device;
at least one processor configured to execute the authentication module, the communication module, the decryption module, and the audit module, wherein:
the communication module is further programmed to receive, from the mobile computing device, a request for a decrypted version of the multimedia data;
the audit module is further programmed to:
  determine that the multimedia data contains sensitive information;
  in response to determining that the multimedia data contains the sensitive information, remove the sensitive information from the multimedia data;
the authentication module is further programmed to authenticate the mobile computing device;
the communication module is further programmed to, after the sensitive information is removed from the multimedia data and the mobile computing device is authenticated, transmit a revised version of the multimedia data to the mobile computing device.

10. The system of claim 9, wherein the audit module is programmed to audit the multimedia data captured by the mobile computing device by performing at least one of:
  archiving the multimedia data;
  filtering the multimedia data;
  identifying a source of origination for the multimedia data;
  routing the multimedia data;
  transmitting a notification that identifies the presence of the sensitive information in the multimedia data.

11. The system of claim 9, wherein the authentication module is programmed to identify the mobile computing device by:
  registering the mobile computing device;
  assigning the asymmetric public key to the mobile computing device;
  transmitting the asymmetric public key to the mobile computing device.

12. The system of claim 9, wherein the audit module is programmed to generate a lossy version of the multimedia data.

13. The system of claim 9, wherein the authentication module is programmed to authenticate the mobile computing device by determining that the mobile computing device transmitted device-specific information associated with the mobile computing device to a server-side computing device.

14. The system of claim 9, wherein the audit module is further programmed to filter the multimedia data.

15. The system of claim 9, wherein the audit module is programmed to determine that the multimedia data comprises sensitive data by:
  calculating a hash and/or checksum for at least a portion of the multimedia data;
  comparing the hash and/or checksum with a known hash and/or checksum for sensitive data.

16. The system of claim 9, wherein the audit module is programmed to audit the multimedia data by generating an audit log.

17. A non-transitory computer-readable medium comprising one or more computer-executable instructions that, when executed by at least one processor of a server-side computing device, cause the server-side computing device to:
  identify a mobile computing device;
  receive multimedia data captured by the mobile computing device, the multimedia data having been:
    identified within a multimedia data stream on at least one of a device-driver level and an operating-system level of the mobile computing device;
    in response to being identified within the multimedia data stream, encrypted using an asymmetric public key before being written to storage within the mobile computing device;
  decrypt the multimedia data captured by the mobile computing device using an asymmetric private key;
  audit the multimedia data captured by the mobile computing device;
  receive, from the mobile computing device, a request for a decrypted version of the multimedia data;
  determine that the multimedia data contains sensitive information;
  in response to determining that the multimedia data contains the sensitive information, remove, at the server-side computing device, the sensitive information from the multimedia data;
  authenticate the mobile computing device;
  after removing the sensitive information from the multimedia data and authenticating the mobile computing device, transmit a revised version of the multimedia data to the mobile computing device.

* * * * *